United States Patent [19]

Boehm et al.

[11] 4,330,568

[45] May 18, 1982

[54] METHOD OF BONDING AT LEAST TWO TYPES OF CERAMIC MATERIALS TO EACH OTHER

[75] Inventors: Valter Boehm, Cesky Tesin; Veslav Marosczyk; Antonin Cieslar, both of Trinec; Miloslav Bartuska, Prague; Karel Rybak, Prague; Karel Zvérina, Prague; Eduard Železny, Prague, all of Czechoslovakia

[73] Assignee: Vysoka skola chemicko-technologicka, Prague, Czechoslovakia

[21] Appl. No.: 113,592

[22] Filed: Jan. 21, 1980

Related U.S. Application Data

[63] Continuation-in-part of Ser. No. 906,204, May 15, 1978, abandoned.

[30] Foreign Application Priority Data

May 13, 1977 [CS] Czechoslovakia .................... 3157-77

[51] Int. Cl.$^3$ .......................... B05D 1/10; B05D 3/02
[52] U.S. Cl. ........................................ 427/34; 156/89; 156/322; 156/273.3; 219/76.16; 264/60; 264/84; 264/332
[58] Field of Search ............. 156/272, 89, 322, 309.9; 264/248, 332, DIG. 76, 84, 131, 327, 60; 228/107, 903; 106/67, 68, 71, 73.4, 69, 73.5; 148/126; 75/235; 427/29, 34, 133, 193, 314

[56] References Cited

U.S. PATENT DOCUMENTS

| | | | |
|---|---|---|---|
| 3,457,102 | 7/1969 | Grekila et al. | 427/193 |
| 3,493,415 | 2/1970 | Grisaffe et al. | 427/34 |
| 3,719,550 | 3/1973 | Arendt | 156/89 X |
| 3,851,140 | 11/1974 | Coucher | 219/76.16 |
| 3,959,567 | 5/1976 | Bradley | 156/272 X |
| 3,998,682 | 12/1976 | Harmsen | 156/322 X |
| 4,048,348 | 9/1977 | Bailey et al. | 427/34 |
| 4,159,353 | 6/1979 | Adelsberg | 156/89 |

Primary Examiner—Michael G. Wityshyn

[57] ABSTRACT

A method of bonding at least two types of refractory ceramic materials, a first material being, for example, fireclay and a second material being, for example, alumina, to each other in order to enhance both the abrasion and corrosion resistances of heat resistant plates for valve closures of foundry ladles. The second, thermally more resistive material, which is applied to the first material in the form of relatively small particles, is preheated on at least the outer surface layers of the particles, the entire volume of the particles usually being preheated or even molten. The bonding of the two preheated materials occurs in such a way that minute particles up to drops of the second, thermally more resistive material are thrown at high speed (with high kinetic energy) onto the preheated surface of the first material. The source of such a relatively high kinetic energy can be constituted by either an explosion or a plasma beam ejected at a high outlet velocity out of the mouth of a plasma torch.

3 Claims, 1 Drawing Figure

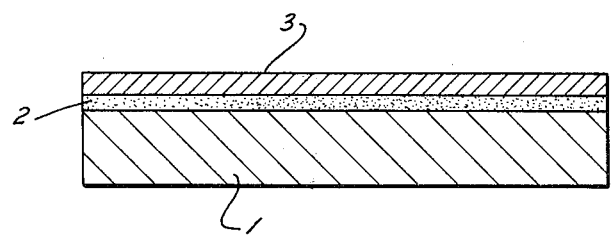

METHOD OF BONDING AT LEAST TWO TYPES OF CERAMIC MATERIALS TO EACH OTHER

This application is a continuation-in-part of application Ser. No. 906,204, filed May 15, 1978, now abandoned.

BACKGROUND OF THE INVENTION

The present invention relates to a method of bonding at least two types of refractory ceramic materials comprised within the $Al_2O_3/SiO_2$ system, especially fireclay and alumina, to each other, and particularly to enhance both the abrasion and corrosion resistances of refractory or heat resistant plates for valve closures of foundry stopper ladles.

As known, steel is cast at present from foundry ladles provided with stopper rods having stopper plugs. However, such a simple arrangement has many disadvantages: the stopper rod consisting of a plurality of stopper rod parts has to be exchanged for a new one after each heat, a relative high consumption of stopper pipes prevents high-grade materials from being used for the manufacture thereof while currently applied materials such as fireclay or fireclay-graphite compositions do not offer the full reliability expected from the stopper or plug mechanisms, the plug and the stopper pipes become worn out by superficial melting, and the stopper may eventually become burned off, all of which make the casting process defective. Among other disadvantages, there can also be named laborious preliminary steps before the casting process since the ladle has to be pre-cooled which in turn endangers effective life of the oven lining, or which makes it necessary to use a protective caisson making the maintenance work troublesome. Foundry ladles equipped with plug or stopper mechanisms may not be heated to highly elevated temperatures since possible dents or cracks arising as a result in the ceramic material of which the stopper rod is made from may cause failures in the casting process.

Developments in modern technological steel making proceses such as vacuum degassing and continuous casting make it necessary to provide new foundry ladle sealing modes. In endeavors to eliminate the disadvantages of plug closures of foundry ladles, there has been developed a valve closure the plates of which are made of refractory ceramic materials based on corundum, zirconium silicate, or, alternatively, magnesite. However, such technology is rather demanding since it requires additional plants as well as high firing temperatures exceeding 1600° C.

During a single casting cycle, multiple shifts of a movable plate of the valve on a stationary plate thereof occur. As a result, the surfaces of said valve plates are abraded and roughened, which may eventually impair the tightness of the valve closure. Apart from this, the outflow hole in the valve plates becomes worn out, due to the erosive action of molten steel, which can result in an uncontrollable enlargement of said hole and, consequently, in an undesirable change in the rate of casting.

To mitigate the above disadvantages it has been proposed to provide the basic material, which has a lower initial deformation temperature, with an upper or coating layer of another material having a higher initial deformation temperature as well as both higher abrasion and corrosion resistances. Such a solution of the problem, however, is rather questionable since it is hardly possible sufficiently to bond the two materials to each other. Thus, although the coating material exhibits better characteristics than the basic one, these characteristics remain essentially unutilized due to an imperfect bond between the two materials, so that the advantages achieved have been rather poor.

It is an object of the present invention to remove the above referred to drawbacks of the prior art, and to attain a substantially better effect in bonding the basic and the coating material to each other, to utilize, to their full extents, the abrasion and corrosion resistences to the latter, and thus to enhance the reliability and life of the bonded material relative to prior art.

SUMMARY OF THE INVENTION

To eliminate the above-mentioned disadvantages of the prior art, an improved method of bonding at least two ceramic materials comprised within the $Al_2O_3/SiO_2$ system to each other is provided. In accordance with one feature of the invention, the basic material is heated to a temperature of from 800° to 1400° C. and the other, coating material is heated to a temperature of from 2100° to 6000° C., whereupon the said coating material is thrown at high speed in particulate form onto said basic material, thereby imparting a large amount of kinetic energy to the particles of the coating material. Another feature of the invention is that the basic material, before having been contacted by the coating material, is melted to a depth of from one to two millimeters. According to a further feature of the invention, the coating material, before being applied to the basic material, is brought into a highly heated or even molten condition, so that there is produced a physicochemical action producing a diffused interlayer between the first material and the second material deposited thereon. Still another feature of the invention is that the coating material is heated to 2100° to 6000° C. by exposing it to a plasma beam induced by an electric arc stabilized by water.

By preheating the first or basic heat resistant material to a temperature of from 800° to 1400° C., or by simultaneously superficially melting its surface up to a depth of from one to two millimeters, and by subsequently bringing this material into contact with the second or coating material which has been heated to a temperature of from 2100° to 6000° C. and has been supplied with a large amount of kinetic energy before it contacts the first material there is achieved a substantially improved effect in bonding the two materials together than that attainable by using the hitherto known methods wherein the bonding of the two layers has been achieved by imparting only mechanical forces to them, as by pressing them together, due, above all, to the degree of roughness of the surface of the basic material. Such improved effect is achieved, according to the invention, by applying the second material in particulate form at temperatures within the above-mentioned range to the preheated and, particularly, partially melted basic material layer; such method brings into play a physicochemical action such as, especially, diffusion, which leads to the formation of a reaction interlayer between the two materials. In the process of the invention, the mullite content in such a reaction interlayer increases to at least twice that in the basic material.

Simultaneously, due to the above-mentioned range of kinetic energy, there is attained a substantially higher compactness or density in the layer of the bond than that exhibited by either of the materials per se when bonded together in a merely mechanical process. The rise in the mullite content ($3Al_2O_3.2SiO_2$) as well as the rise in the density of the reactive layer favorably influences characteristics which result in the relatively long operating life of the valve closures. The invention enables the surface or coating layer to be perfectly embedded into the surface of the basic material, and the adhesion therebetween is increased up to double or triple the value observed with well-known prior art devices of the same general type. In using the valve closures of foundry ladles manufactured according to the present invention, the detachment of surface layer particles adjacent the casting hole after multiple openings and closings of the valve is substantially reduced. Further the compact mullite layer offers a substantially better protection against slag infiltration when compared with hitherto used relatively porous layers of the two materials to be bonded together. In this way any formation of low-fusing eutectic smelts on the layer boundary is prevented, which formation has been observed in the known mechanical combinations and has led after a time to a corrosive destruction of the mechanical bond. Moreover, by bringing the second material to be applied into a highly heated or molten condition before bonding the two materials together, the formation of secondary mullite is favorably influenced.

The following example is given as illustrative only without, however, limiting the invention to the specific details thereof.

DESCRIPTION OF THE DRAWING

The single FIGURE in the drawing is a schematic view in cross section through a composite valve plate made in accordance with the method of the invention.

In the process of manufacturing valve plates by practicing the method according to the invention, there is first formed a basic, first plate 1 from a refractory material, such as fire-clay with alumina content, by pressing on an ordinary press, such plate being then fired at a temperature of from 1450° to 1500° C. The basic plate is then heated to 1250° C., whereupon a second, coating material 3 of alumina, such as corundum, is applied thereonto in particle form after the surface of the second material has been brought into a highly heated condition by heating it by means of a plasma torch, the plasma being generated by an electric arc and stabilized by water. A bonding layer 2, composed largely of mullite is thereby formed between layers 1 and 3.

The second, thermally more resistive material is preheated at least on its surface layer. Since the second material is applied to the first material in the form of relatively small particles (as a rule of 10–100 μm in diameter), the entire volume of the particles usually become preheated to a high temperature, or even molten.

The bonding of the two preheated materials occurs in such a way that minute particles up to drops of the second, thermally more resistive material are thrown at a high speed and with high kinetic energy ($0.5 \times 10^{-7}$ Joule) onto the surface of the first material. The source of such relatively high kinetic energy can be constituted by either an explosion or by a plasma beam ejected at a high outlet velocity out of the mouth of a plasma torch. The first, thermally less resistance material is progressively coated with minute particles (of less than 0.1 μm dia.) of the second, thermally more resistive material highly preheated up to molten state. In this way a perfect bond between the two materials is produced.

The composition of the fireclay used may vary between 40 and 80% by weight alumina and from 60 to 20% by weight silica. The content of the remaining accompanying oxides does not exceed 2% by weight as a rule. The melting point of the fireclay layer 1 employed varies within the range 1550°–1900° C. The alumina layer 3 melts in the range 2000°–2032° C.

During testing, the valve closure in which the basic plate and the upper material were bonded to each other according to the method of the invention, provided an absolute reliability, allowing multiple openings and closings of the valve as well as use of the thus manufactured ceramic valve plate during a number of successive castings. No separation of the surface layer from the basic material of the closure in operation was observed.

Although the invention is described with reference to a preferred embodiment thereof, it is to be expressly understood that it is in no way limited to the disclosure of such preferred embodiment but is capable to numerous modifications within the scope of the appended claims.

We claim:

1. In a method of bonding at least two types of ceramic materials to each other in order to enhance both abrasion and corrosion resistances of fireproof plates for valve closures of foundry ladles, the improvement wherein a first refractory material made of fireclay, having a lower initial deformation temperature, is heated to a first temperature which is less than the melting temperature of the first material and which is in the range of from 800°–1400° C., and a second refractory material made of alumina, having a higher initial deformation temperature than that of the first material, is heated to a second temperature of from 2100°–6000° C., following which the second material is applied by throwing it at high speed in particulate form onto the preheated surface of said first material after preheating at least the surface of the particles of the second material to said second temperature, the first material, before having been brought into contact with the second material, being heated and superficially melted to a depth of from one to two millimeters, and the heating of the second material, before it is applied to the first material, bringing at least the surfaces of the particles of the second material into a condition such that there is produced a physico-chemical action producing a diffused interlayer between the first material and the second material deposited thereon.

2. A method as defined in claim 1, wherein the diffused interlayer contains mullite ($3Al_2O_3.2SiO_2$).

3. A method as defined in claim 2, wherein the surface of the particles of the second material and the surface of the first material are heated by exposing them to a plasma beam induced by an electric arc and stabilized by water.

* * * * *